United States Patent
Liu et al.

(10) Patent No.: US 7,837,400 B2
(45) Date of Patent: Nov. 23, 2010

(54) OPTOELECTRONIC TRANSCEIVER ASSEMBLY AND RELEASE MECHANISM EMPLOYED THEREIN

(75) Inventors: Li-Tao Liu, Shenzhen (CN); Jian-Ping Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 118 days.

(21) Appl. No.: 12/406,040

(22) Filed: Mar. 17, 2009

(65) Prior Publication Data

US 2010/0046954 A1    Feb. 25, 2010

(30) Foreign Application Priority Data

Aug. 20, 2008    (CN) .................. 2008 2 0301879

(51) Int. Cl.
G02B 6/36 (2006.01)
G02B 6/00 (2006.01)
(52) U.S. Cl. .......................................... 385/92; 385/53
(58) Field of Classification Search ............... None
See application file for complete search history.

(56) References Cited

U.S. PATENT DOCUMENTS

| | | | |
|---|---|---|---|
| 6,434,015 B1 | 8/2002 | Hwang | |
| 6,786,653 B1 * | 9/2004 | Hwang et al. | 385/92 |
| 7,281,863 B2 * | 10/2007 | Yamada et al. | 385/92 |
| 7,307,847 B2 * | 12/2007 | Torres et al. | 361/730 |
| 7,317,862 B2 * | 1/2008 | Minota et al. | 385/134 |
| 7,374,347 B1 * | 5/2008 | Oki et al. | 385/89 |
| 7,507,111 B2 * | 3/2009 | Togami et al. | 439/484 |
| 2003/0044129 A1 * | 3/2003 | Ahrens et al. | 385/92 |
| 2003/0156801 A1 * | 8/2003 | Hwang | 385/92 |
| 2003/0194190 A1 * | 10/2003 | Huang | 385/92 |
| 2005/0117855 A1 * | 6/2005 | Yang et al. | 385/92 |
| 2006/0093285 A1 * | 5/2006 | Park | 385/92 |
| 2008/0089649 A1 | 4/2008 | Wang | |
| 2008/0232758 A1 * | 9/2008 | Miyoshi et al. | 385/136 |
| 2008/0247762 A1 * | 10/2008 | Yoshikawa et al. | 398/138 |

* cited by examiner

*Primary Examiner*—Rhonda S Peace
(74) *Attorney, Agent, or Firm*—Frank R. Niranjan

(57) ABSTRACT

An optoelectronic transceiver module includes a cage, a transceiver module and a release mechanism. The cage defines an opening and includes a retaining tab formed around the opening. A retaining hole is defined in the retaining tab. The transceiver module received in the cage through the opening includes a first surface and a second surface opposite to the first surface. A fixed latch disposed on the first surface mates with the retaining hole so as to lock the transceiver module in the cage. The release mechanism includes a release trigger and a release lever inflexibly connected together. The release lever is disposed between the retaining tab and the transceiver module. The release trigger abuts the second surface. When the release trigger is pressed towards the second surface, the release lever is subsequently driven to disengage the fixed latch from the retaining tab.

18 Claims, 5 Drawing Sheets

OPTOELECTRONIC TRANSCEIVER ASSEMBLY AND RELEASE MECHANISM EMPLOYED THEREIN

BACKGROUND

1. Technical Field

The present disclosure relates to fiber-optic communications, and in particular to an optoelectronic transceiver assembly and release mechanism.

2. Description of Related Art

Optoelectronic transceiver modules provide bi-directional transmission of data between an electrical interface and an optical data link. The transceiver module receives electrically encoded data signals, which are converted into optical signals and transmitted over the optical data link. The transceiver module also receives optically encoded data signals, which are converted into electrical signals and transmitted onto the electrical interface.

The optoelectronic transceiver module is generally retained in a cage. The cage conventionally comprises a spring means located in a rear portion thereof. When the optoelectronic transceiver module is withdrawn from the cage, a release mechanism forces a fixed latch of the optoelectronic transceiver module out from a retaining hole defined in a retaining tab of the cage. The fixed latch is released from the retaining tab. The optoelectronic module is then ejected from the cage by the spring means.

It is thus desirable to provide a release mechanism with simple structure and easy operation, and an optoelectronic transceiver module using the mechanism.

DETAILED DESCRIPTION OF EMBODIMENTS

Figure 1:
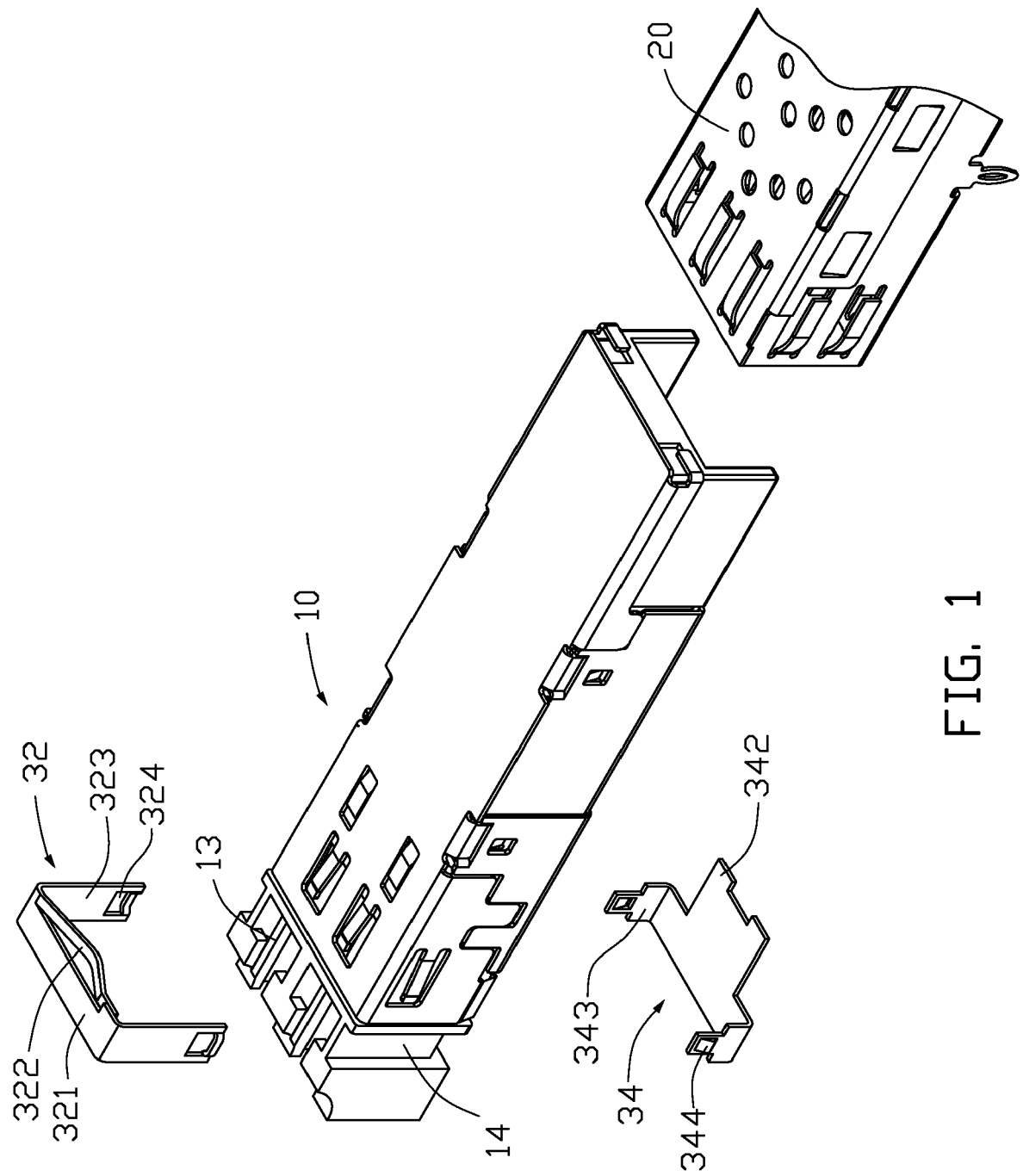
FIG. 1 is an exploded perspective view of an optoelectronic transceiver assembly in accordance with the disclosure.
Figure 2:
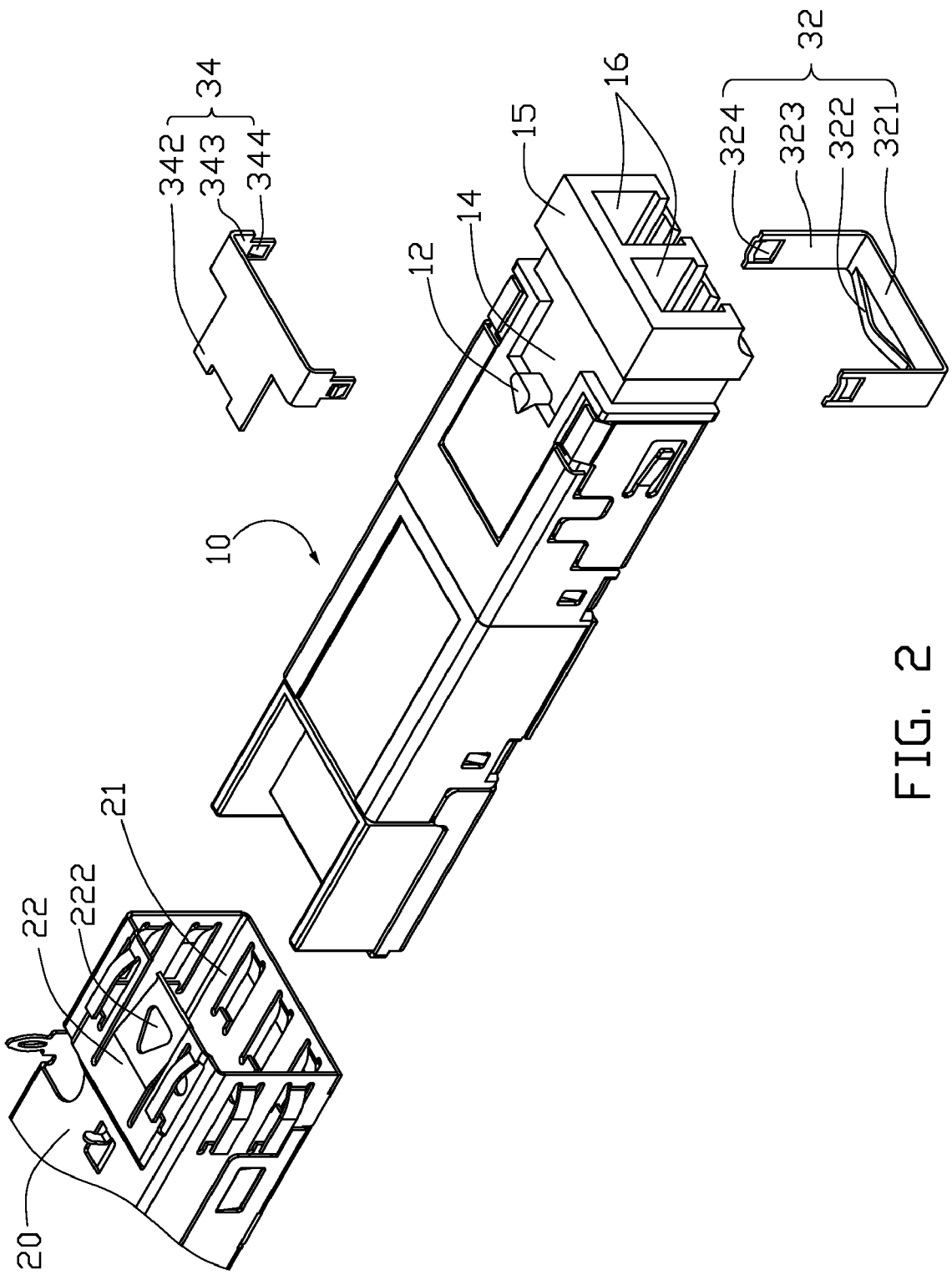
FIG. 2 is an exploded perspective view from another direction of the optoelectronic transceiver assembly of FIG. 1.
Figure 3:
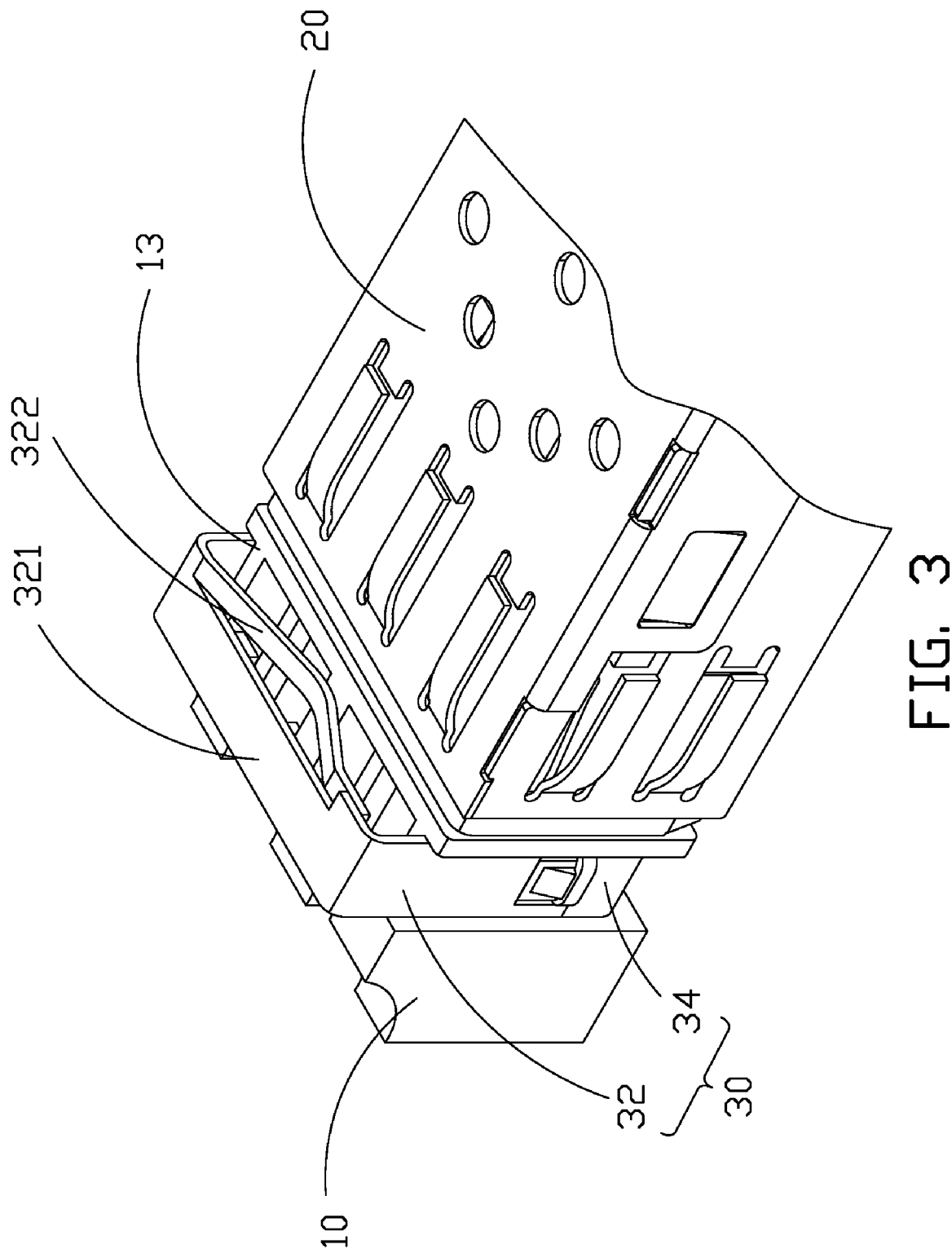
FIG. 3 is a partially assembled perspective view of the optoelectronic transceiver assembly of FIG. 1, further showing a release mechanism as disclosed.

Referring to FIG. 1-FIG. 3, an optoelectronic transceiver assembly according to the present disclosure comprises a cage 20, a transceiver module 10, and a release mechanism 30.

The cage 20 defines a receiving space therein with an opening 21 at a front part of the cage 20, and a retaining tab 22 configured around the opening 21. The retaining tab 22 is an inwardly elastic metal sheet, and defines a retaining hole 222 therein. The transceiver module 10 defines two cavities 16 receiving fibers (not shown) and comprises a first surface 15 and a second surface 13 opposite to the first surface 15. A fixed latch 12 is disposed on the first surface 15. The transceiver module 10 also defines a receiving groove 14 between the cavities 16 and the latch block 12. The transceiver module 10 is received in the receiving space of the cage 20 through the opening 21, where the fixed latch 12 mates with the retaining hole 222 to lock the transceiver module 10 in the cage 20.

The release mechanism 30 comprises a release trigger 32 and a release lever 34 with an inflexible connection therebetween. The release trigger 32 resiliently abuts the second surface 13. The release lever 34 is disposed between the retaining tab 22 and the first surface 15 of the transceiver module 10. The release trigger 32 and the release lever 34 collectively form a ring received in the receiving groove 14 around the transceiver module 10. The release trigger 32 comprises a contact surface 321. An elastic element 322 is configured between the second surface 13 of the module 10 and the contact surface 321. In this embodiment, the elastic element 322 is integrally formed with the release trigger 32, and is angled towards the transceiver module 10 in a V-shape. Therefore, the release trigger 32 elastically abuts the transceiver module 10. Alternatively, the number of the elastic elements 322 may be more than one, and the contact surface 321 can further be provided as an elastic element to elastically connect the transceiver module 10.

Figure 4:
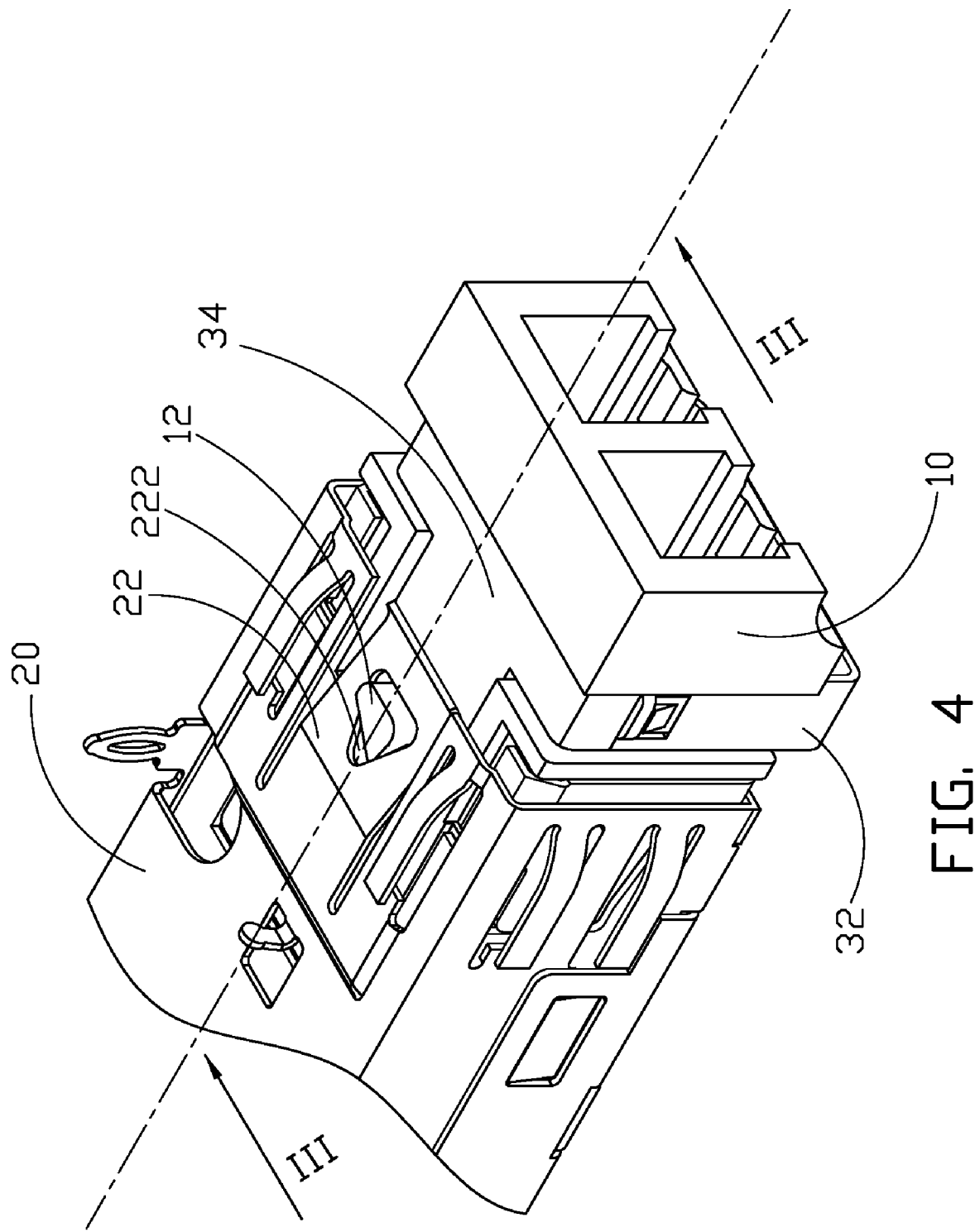
FIG. 4 is a partially assembled perspective view from another direction of the optoelectronic transceiver assembly of FIG. 3.
Figure 5:
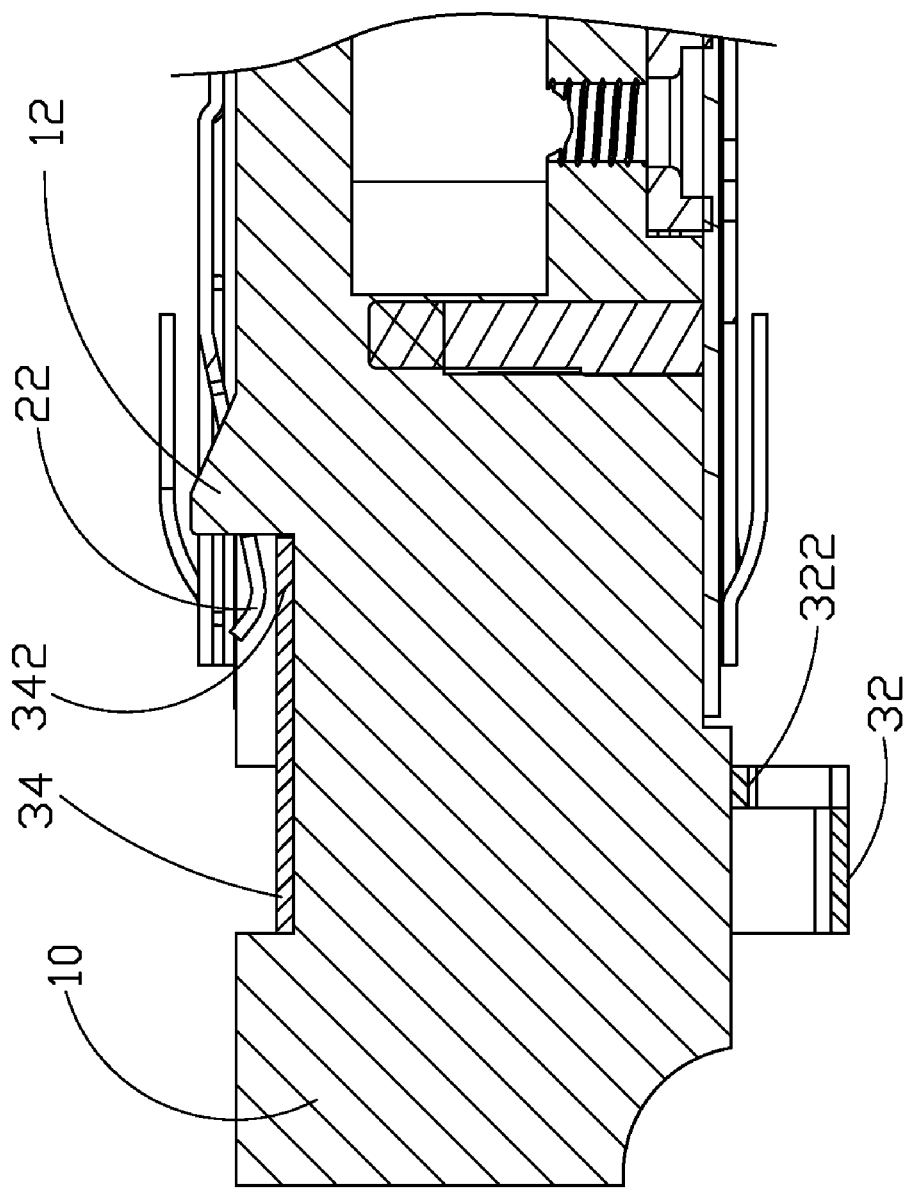
FIG. 5 is a cross-section along line III-III of FIG. 4.

Referring to FIG. 4 and FIG. 5, the release lever 34 comprises a release end 342. When installing the release mechanism 30, the release lever 34 is disposed on the first surface 15, and the release end 342 is specifically disposed between the retaining tab 22 and the transceiver module 10.

In this embodiment, the release trigger 32 and the release lever 34 respectively comprise a pair of sides 323, 343, wherein the pair of sides 323 of the release trigger 32 are respectively and inflexibly connected to the pair of sides 343 of the release lever 34 via a connection device. In the illustrated embodiment, the connection device comprises a pair of securing holes 324 defined in the release trigger 32 and a pair of securing blocks 344 disposed on the release lever 34, where the securing blocks 344 mates with the securing holes 324, to inflexibly connect the release lever 34 to the release trigger 32. In other embodiments, the connection device may comprise a plurality of positioning pins and a matching plurality of positioning holes, to inflexibly connect the release lever 34 to the release trigger 32. The release trigger 32 can further be integrally formed with the release lever 34 and placed around the module 10. Accordingly, the release mechanism has a simple structure, and production cost is reduced.

The release trigger 32 is tightly mounted around the transceiver module 10, such that the pair of sides 323 and the pair of sides 343 all closely contact the transceiver module 10. Mounting of release mechanism 30 around the transceiver module 10 is thus secure.

When the transceiver module 10 is released from the cage 20, the release trigger 32 is pressed towards the second surface 13 of the transceiver module 10 by elastic deformability of the elastic element 322, and the release lever 34 is subsequently driven to disengage the fixed latch 12 from the retaining tab 22, and transceiver module 10 is ejected from the cage 20. When external force is removed, the release trigger 32 of the release mechanism 30 recovers via elasticity of the elastic element 322. The fiber does not need to be removed from the transceiver module 10 during release, which is convenient and efficient.

While exemplary embodiments have been described, it should be understood that they have been presented by way of example only and not by way of limitation. The breadth and scope of the disclosure should not be limited by the described exemplary embodiments, but only in accordance with the following claims and their equivalents.

What is claimed is:

1. An optoelectronic transceiver assembly, comprising:
   a cage defining a receiving space therein with an opening, and comprising a retaining tab configured around the opening, wherein the retaining tab defines a retaining hole therein;

a transceiver module received in the receiving space through the opening, the transceiver module comprising a first surface and a second surface opposite to the first surface, and a fixed latch disposed on the first surface and mating with the retaining hole so as to fix the transceiver module in the cage; and a release mechanism comprising a release trigger and a release lever, inflexibly connected together, wherein the release lever is disposed between the retaining tab and the first surface of the transceiver module, wherein the release trigger resiliently abuts the second surface;

wherein when the release trigger is pressed towards the second surface, the release lever is subsequently driven to disengage the fixed latch from the retaining tab.

2. The optoelectronic transceiver assembly as claimed in claim 1, further comprising an elastic element connected between the second surface and the release trigger.

3. The optoelectronic transceiver assembly as claimed in claim 2, wherein the elastic element is integrally formed with the release trigger.

4. The optoelectronic transceiver assembly as claimed in claim 3, wherein the elastic element is V-shaped.

5. The optoelectronic transceiver assembly as claimed in claim 1, wherein the release trigger comprises a pair of sides, and the release trigger is tightly mounted around the transceiver module.

6. The optoelectronic transceiver assembly as claimed in claim 1, wherein the release trigger and the release lever integrally form the transceiver module.

7. The optoelectronic transceiver assembly as claimed in claim 1, wherein the release trigger and release lever are connected via a connection device.

8. The optoelectronic transceiver assembly as claimed in claim 7, wherein the connection device comprises a pair of securing holes defined in the release trigger and a pair of securing blocks disposed on the release lever, wherein the securing blocks mates with the securing holes to inflexibly connect the release lever to the release trigger.

9. The optoelectronic transceiver assembly as claimed in claim 8, wherein the release trigger and the release lever respectively comprise a pair of sides on a free end of which the securing holes and the securing blocks are respectively located.

10. The optoelectronic transceiver assembly as claimed in claim 1, wherein the transceiver module defines a receiving groove therearound, in which the release mechanism is received.

11. A release mechanism for a transceiver module, the transceiver module comprising a first surface and a second surface opposite to the first surface, a fixed latch disposed on the first surface and mating with a retaining hole of a retaining tab of the cage so as to lock the transceiver module in a cage, the release mechanism comprising:

a release lever disposed between the retaining tab and the first surface of the transceiver module; and a release trigger resiliently abutting the second surface, and inflexibly connected to the release lever;

wherein when the release trigger is pressed towards the second surface, the release lever is subsequently driven to disengage the fixed latch from the retaining tab.

12. The release mechanism as claimed in claim 11, further comprising an elastic element connected between the second surface and the release trigger.

13. The release mechanism as claimed in claim 12, wherein the elastic element is integrally formed with the release trigger.

14. The release mechanism as claimed in claim 13, wherein the elastic element is V-shaped.

15. The release mechanism as claimed in claim 11, wherein the release trigger comprises a pair of sides, wherein the release trigger is tightly mounted around the transceiver module.

16. The release mechanism as claimed in claim 11, wherein the release trigger and the release lever are integrally formed around the transceiver module.

17. The release mechanism as claimed in claim 11, wherein the release trigger and the release lever are connected via a connection device.

18. The release mechanism as claimed in claim 17, wherein the connection device comprises a pair of securing holes defined in a pair of sides of the release trigger and a pair of securing blocks disposed on a pair of sides of the release lever, wherein the securing blocks mate with the securing holes to inflexibly connect the release lever to the release trigger.

* * * * *